(12) United States Patent
Rao Gandham et al.

(10) Patent No.: US 10,261,890 B2
(45) Date of Patent: *Apr. 16, 2019

(54) METHODS AND SYSTEMS FOR EXECUTING TESTS USING GROUPED/FILTERED TEST CLASSES DURING TESTING OF AN APPLICATION

(71) Applicant: salesforce.com, inc., San Francisco, CA (US)

(72) Inventors: Vamshidhar Rao Gandham, Newark, CA (US); Adarsh Ramakrishna, Berkeley, CA (US); Scott Glaser, Dublin, CA (US); Ashwin Simha Reddy Vengareddy, Fremont, CA (US); Jonathan Rico Morales, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 15/140,803

(22) Filed: Apr. 28, 2016

(65) Prior Publication Data
US 2017/0075791 A1 Mar. 16, 2017

Related U.S. Application Data

(60) Provisional application No. 62/218,334, filed on Sep. 14, 2015.

(51) Int. Cl.
*G06F 11/36* (2006.01)
*G06F 9/50* (2006.01)
*H04L 29/08* (2006.01)

(52) U.S. Cl.
CPC ............ *G06F 11/3664* (2013.01); *G06F 9/50* (2013.01); *G06F 11/3684* (2013.01); *G06F 11/3688* (2013.01); *H04L 67/10* (2013.01)

(58) Field of Classification Search
CPC ............ G06F 11/3664; G06F 11/3684; G06F 11/3688; G06F 9/50; H04L 67/10
See application file for complete search history.

(56) References Cited

U.S. PATENT DOCUMENTS 5,577,188 A 11/1996 Zhu
5,608,872 A 3/1997 Schwartz et al.
(Continued)

*Primary Examiner* — S. Sough
*Assistant Examiner* — Timothy P Duncan
(74) *Attorney, Agent, or Firm* — Lorenz & Kopf, LLP

(57) ABSTRACT

Computer implemented methods and systems are provided for executing tests in a system that includes a user system and a cloud-based computing platform. The user system includes a processing system, memory and an input system that receives input parameters specified by a user of the user system. The memory can store a test class filter module executable by the processing system. Upon being executed by the processing system, the test class filter module can, based on one or more of the input parameters, group and filter test class identifiers to generate a unique test class identifier array of filtered test class identifiers that correspond to a particular subset of tests that are to be executed during testing of an application. A test execution engine can then execute the particular subset of tests corresponding to the filtered test class identifiers specified in the unique test class identifier array.

17 Claims, 11 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0087668 A1* | 7/2002 | San Martin ............... G06F 8/65 709/221 |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042210 A1* | 2/2012 | Glaser ................ G06F 11/3684 714/38.1 |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2016/0321169 A1* | 11/2016 | Chacko ................ G06F 11/368 |

* cited by examiner

Report

Code Coverage Summary: *
Targeted code coverage: 94.77% [The customized Targeted code coverage threshold was: 80%]  ⎫
Org wide code coverage: 42.00% [The customized org code coverage threshold was: 42%]         ⎬ 610

Test Execution Summary:
Total test classes executed: 26
Total test methods executed: 276    ⎫
Test methods pass count: 276        ⎬ 620
Test method fail count: 0

Apex test Report:    ⎫
Detail Test Report   ⎬ 630

Detailed code coverage report

| Apex Class Name | API Version | Code Coverage % | #Covered Lines | #Uncovered Lines | Covered Lines | Uncovered Lines | Length Without Comments (Bytes) |
|---|---|---|---|---|---|---|---|
| Wrapper Example Controller | 26.0 | 78.38% | 29 | 8 | 15,17,19,23,27,30,32,33,34,35,39,43,45,47,50,51,52,56,57,58,59,60,61,65,72,75,77,81,83 | 88,90,91,92,94,95,96,98 | 2695 |
| Wrapper Example Controller 1 | 26.0 | 100.00% | 29 | 0 | 6,9,12,15,17,19,23,27,30,32,33,35,39,43,45,47,50,52,56,58,59,60,61,65,72,75,77,81,83 | - | 2387 |
| Wrapper Example 2 | 26.0 | 100.00% | 29 | 0 | 7,10,13,16,18,20,24,28,31,33,34,36,40,44,46,48,51,53,57,59,60,61,62,66,73,,76,78,82,84 | - | 2357 |
| Wrapper Example 1 | 26.0 | 100.00% | 29 | 0 | 7,10,13,16,18,20,24,28,31,33,34,36,40,44,46,48,51,53,57,59,60,61,62,66,73,,76,78,82,84 | - | 2357 |
| Wrapper Example Controller 2 | 26.0 | 100.00% | 29 | 0 | 16,18,20,24,28,31,33,34,35,36,40,44,46,48,51,52,53,57,58,59,60,61,62,66,73,76,78,82,94 | - | 2387 |

⎫
⎬ 640
⎭

Duplicate Apex Class Names Across Manifest and Regular Expressions
Wrapper Example Controller       ⎫
Sample Class 2                    ⎬ 650

Invalidal/Non-existant Apex Class Names Across Manifest Files and Regular Expressions
Author Page Config        ⎫
Author Page Config Test   ⎬ 660

Apex Code Coverage Best Practices

FIG. 6

METHODS AND SYSTEMS FOR EXECUTING TESTS USING GROUPED/FILTERED TEST CLASSES DURING TESTING OF AN APPLICATION

CROSS-REFERENCE TO RELATED APPLICATION

This application claims the benefit of U.S. Provisional Application No. 62/218,334, filed Sep. 14, 2015, which is hereby included by reference in its entirety.

TECHNICAL FIELD

Embodiments of the subject matter described herein relate generally to computer implemented methods and systems for testing an application in a cloud-based computing environment, and, more particularly, to computer implemented methods and systems for grouping and filtering test classes and executing tests using the grouped/filtered test classes.

BACKGROUND

Many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider.

Multi-tenant cloud-based architectures have been developed to improve collaboration, integration, and community-based cooperation between customer tenants without compromising data security. Generally speaking, multi-tenancy refers to a system where a single hardware and software platform simultaneously supports multiple customers or tenants from a common data storage element (also referred to as a "multi-tenant data store"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application feature software between multiple sets of users.

Cloud-based applications for a cloud computing environment are typically developed by many different "users" including developers, customers, independent software vendors (ISVs), quality engineers, business units, virtual groups, sub-tenants, scrum teams, etc. An integrated development environment typically includes a collection of tools that can be used to create, debug, and test applications. A cloud-based application must be tested by a variety of different users who belong to different cross-functional teams, business units, sub-tenants, etc. To facilitate this testing a wide variety of test tools and test execution engines have been developed.

Existing test tools simply allow the user to manually select certain tests (e.g., by using a checkbox for a particular test name in a test execution page) they want to execute, or to select all possible tests to be executed. These approaches can be tedious and time-consuming. It would also be desirable to provide users with greater control over which tests are executed during testing that pertain to the interest or ownership area of a sub-tenant.

During testing of an application, "code coverage" is one particular metric that is of interest to users who are conducting tests on the application. For example, a user may be interested in the amount of code covered by certain tests of selective components and/or modules (e.g., which lines of code are covered by a certain tests of selective components and/or modules versus which lines are not). It would also be desirable to provide users with improved tools for computing code coverage and presenting code coverage results that pertain to the interest or ownership area of a sub-tenant.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

Figure 5A:
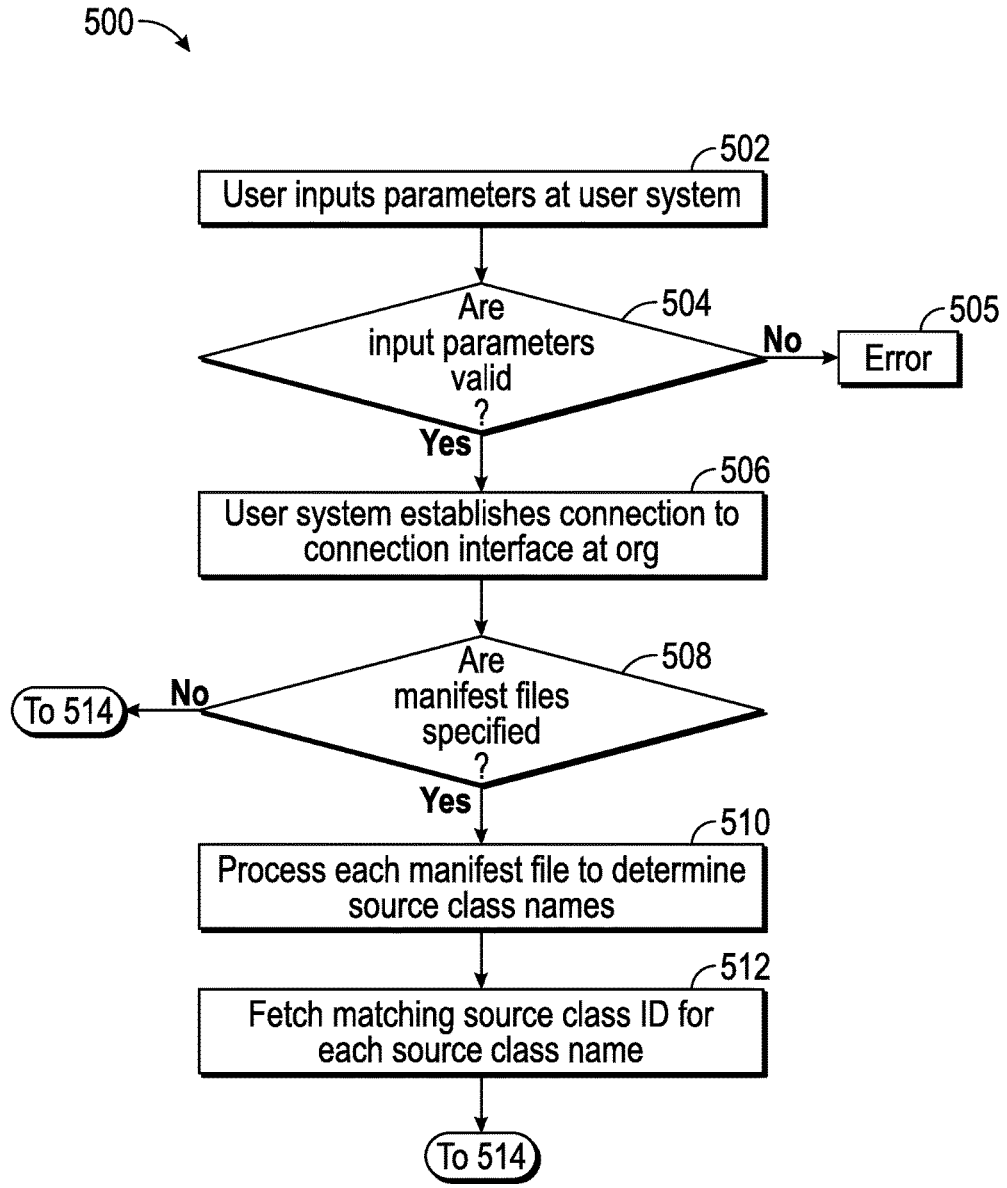
Figure 5B:
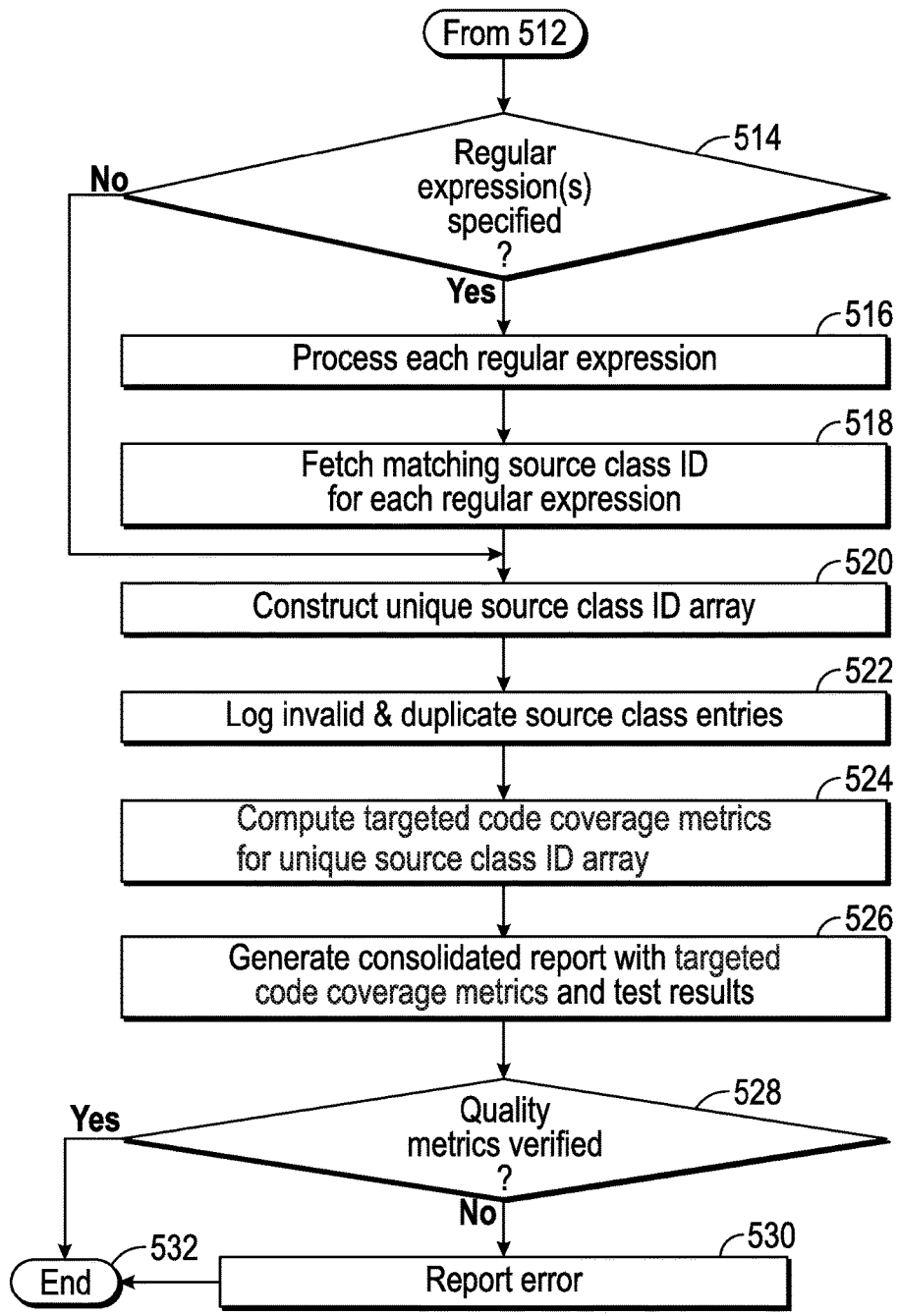

FIGS. 5A and 5B collectively illustrate a flowchart that illustrates an exemplary method for grouping and filtering source class identifiers and generating code coverage metrics using grouped and filtered source class identifiers in accordance with an embodiment.

FIG. 6 is a screenshot that illustrates an example of a consolidated report that can be displayed at a user interface of the user system in accordance with one exemplary implementation of an embodiment.

Figure 7:
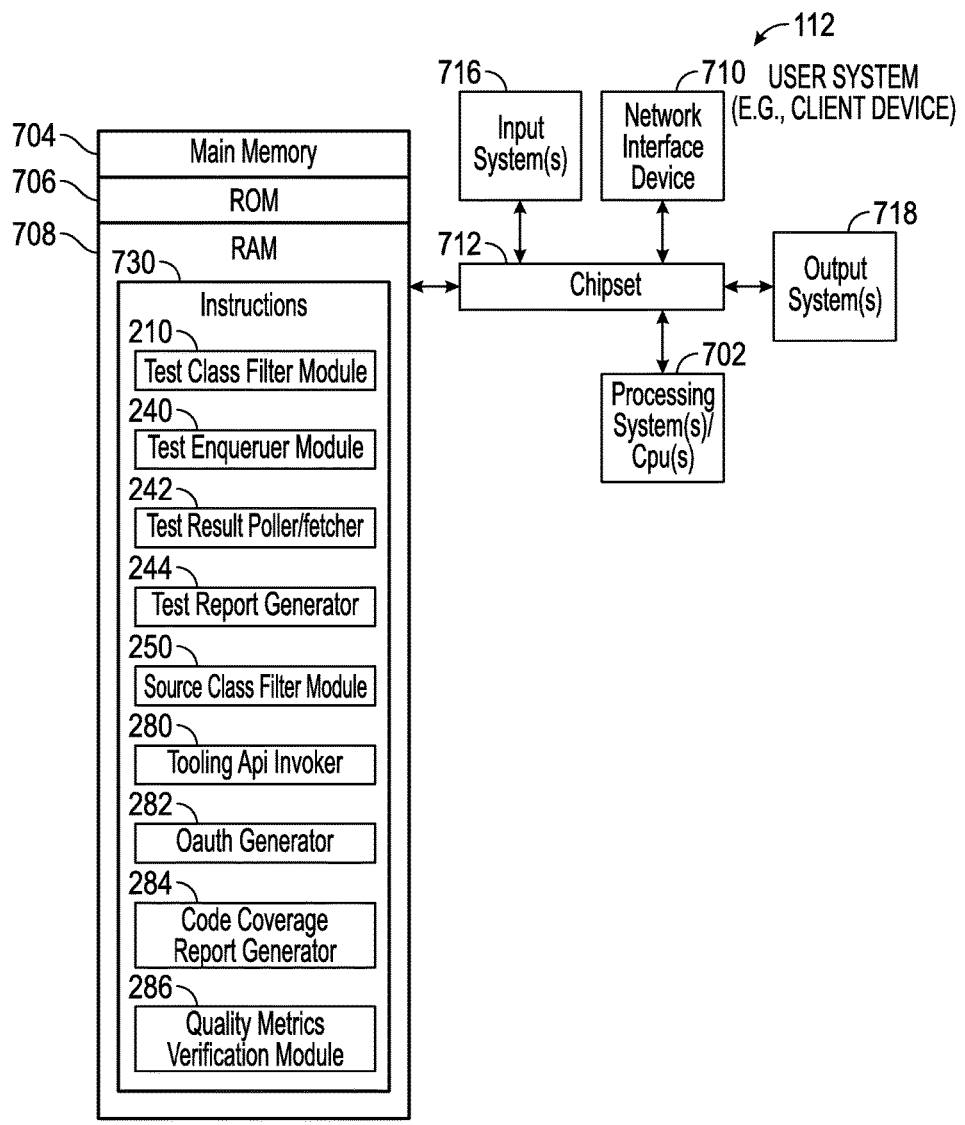

FIG. 7 is a schematic block diagram of a user system in accordance with an embodiment.

Figure 8:
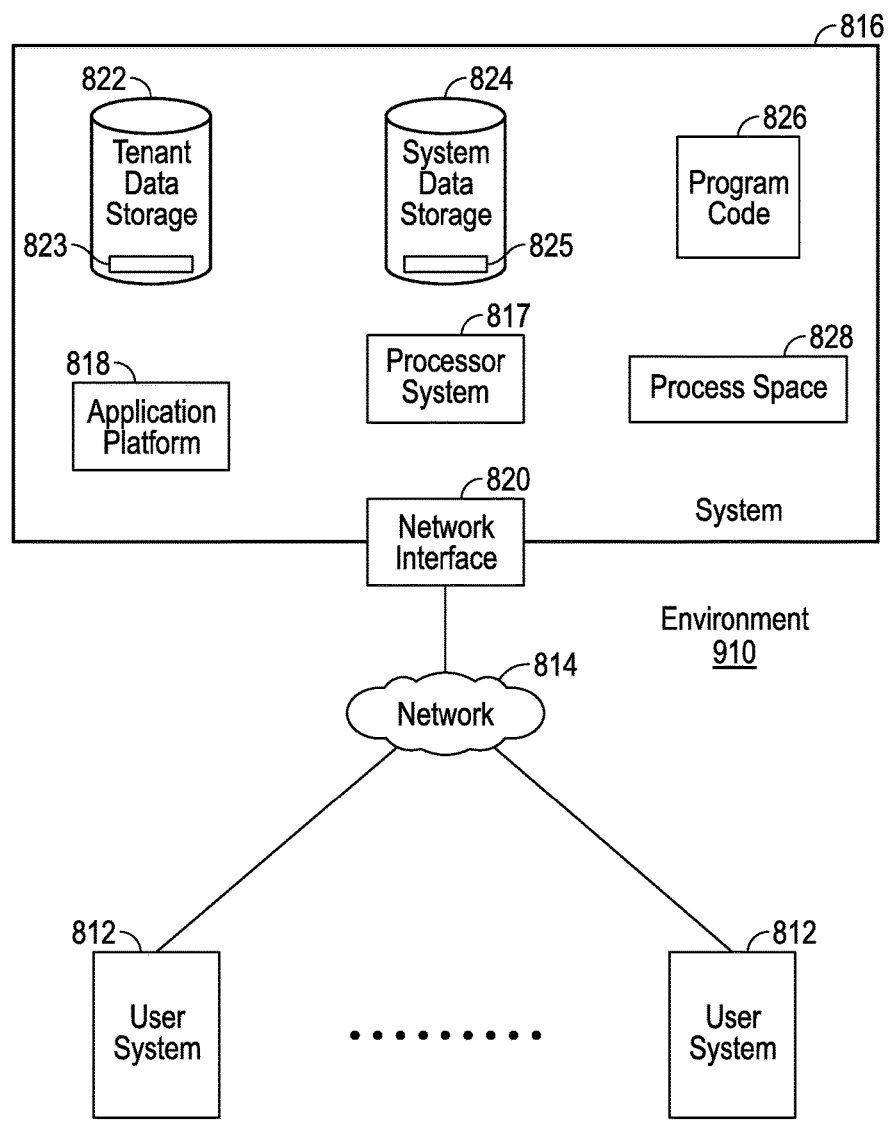

FIG. 8 illustrates a block diagram of an example environment in which the embodiments described herein may be implemented.

Figure 9:
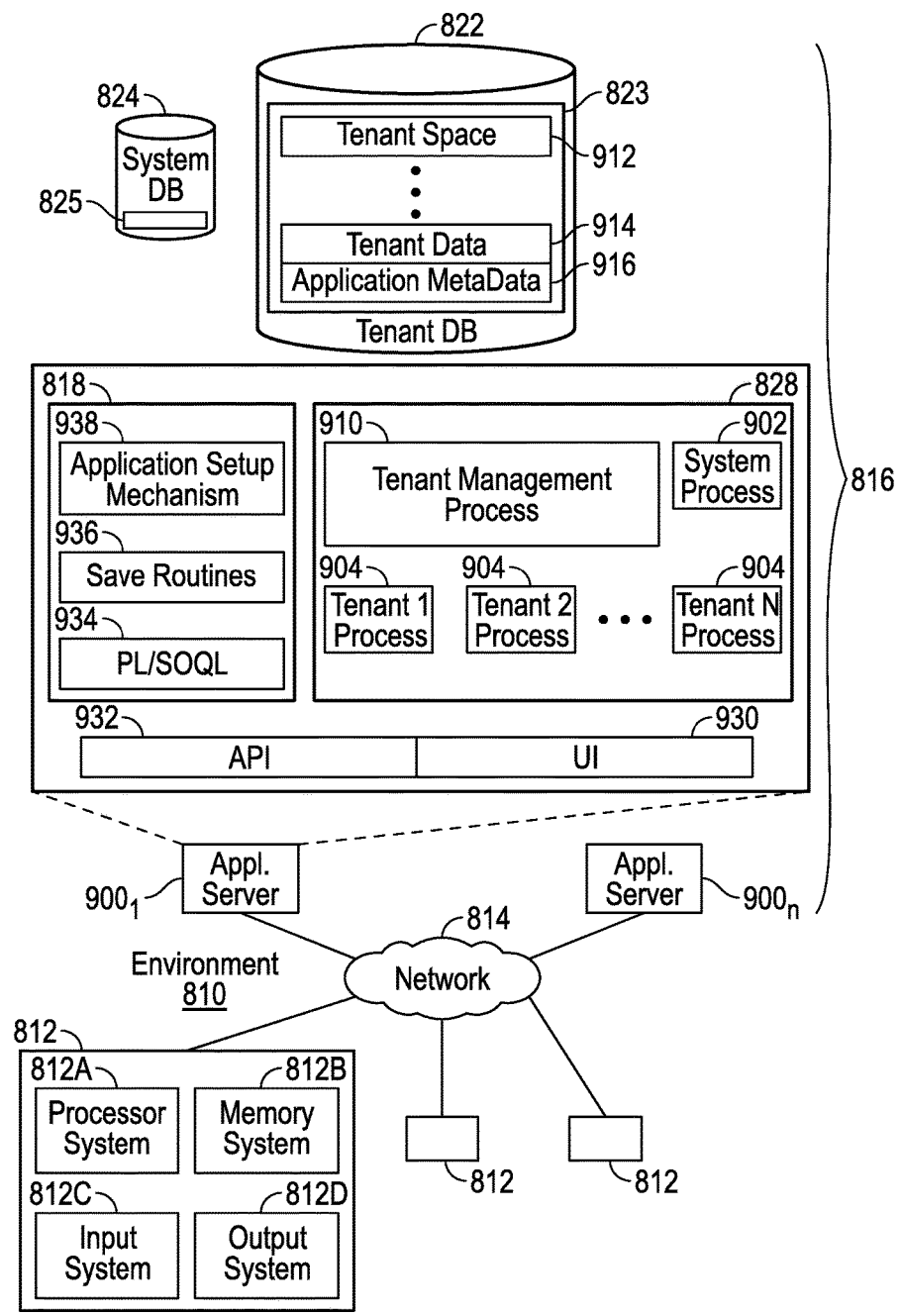

FIG. 9 illustrates a block diagram of another example environment in which the embodiments described herein may be implemented.

Figure 10:
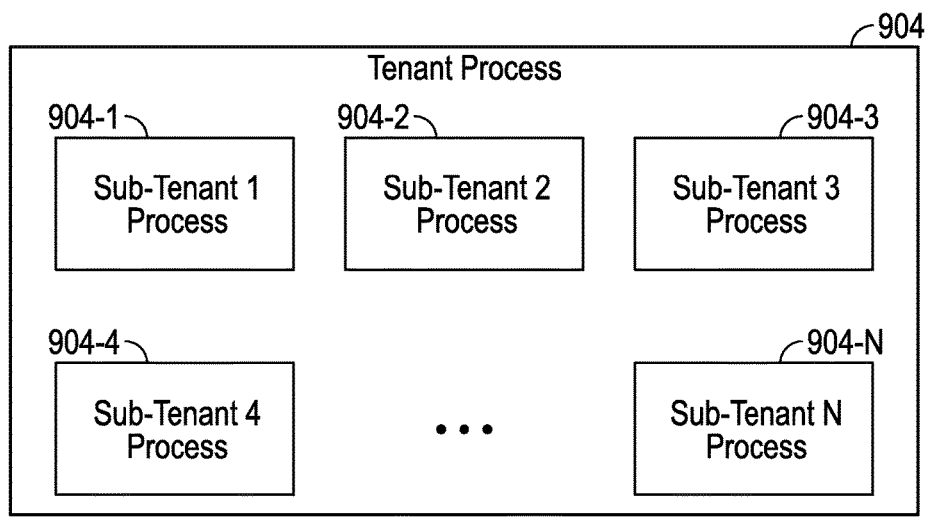

FIG. 10 illustrates a block diagram of sub-tenant process spaces that can be defined within one of the tenant process spaces of FIG. 9 to explain the concept of sub-multi-tenancy in accordance with an embodiment.

DETAILED DESCRIPTION

Current testing systems do not provide the user with the ability to selectively choose a group or set of tests that they want to execute. Manual section of the certain tests is a time-consuming and tedious process especially when the number of tests to be executed is large. Selecting an option to run all tests is inefficient since it is unnecessarily comprehensive and time consuming when the user may not care about the test results for many of the tests. In addition, the test results are simply presented in a way that presents all of the test results to the user thereby making it difficult for the user to identify which test results the user is interested in. Another problem is that some tests can take too long to execute, which can block other tests from running thereby delaying the user from viewing the results they want to view. It would be desirable to improve the user's efficiency and productivity during testing, and to give the user more flexibility in choosing which tests to execute. It would also be desirable to present the results of the desired tests in a way that is easy for the user to view and interpret.

In the development of multi-tenant applications, different sub-tenants (e.g., functional groups or business units) can develop different parts (e.g., modules or components) of an application, and may therefore be interested in code coverage metrics for different "parts" of the code base that they are involved with. However, current tools do not provide an easy way for a specific user or sub-tenant to segregate certain sets of code so that code coverage can be computed for the specific portions of the code base that they are interested in. For example, one existing tool computes code coverage for an entire organization, and allows the user to graphically view (line-by-line) code coverage for a given source class. However, to view the code coverage metrics, the user has to view (in a UI of a developer console) each class in the organization. If the user wants to get the code coverage metrics for a given set of classes, the user has to repeat this process for each class. This is not an optimal use of resources and time, and especially when the entire set of classes is too large. The user has no easy way to choose which source classes they are interested in (e.g., that are relevant to the user's team versus the entire organization), and obtain code coverage metrics for those source classes that are easy to view and interpret.

Figure 1:
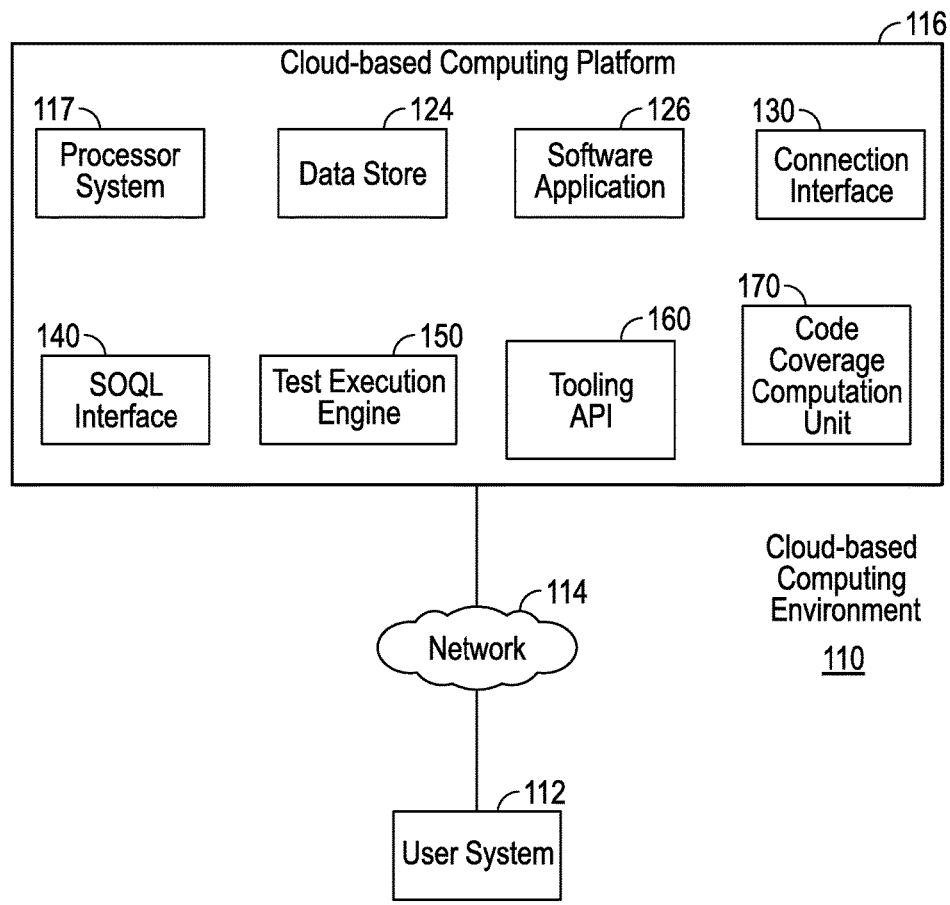
FIG. 1 illustrates a block diagram of an example cloud-based computing environment in which the disclosed embodiments may be implemented.

FIG. 1 illustrates a block diagram of an example cloud-based environment 110 in which the disclosed embodiments may be implemented. FIG. 1 and the following discussion are intended to provide a brief, general description of one non-limiting example of an example environment in which the embodiments described herein may be implemented. Those skilled in the art will appreciate that the embodiments described herein may be practiced with other computing environments.

The cloud-based computing environment 110 includes a user system 112 that is communicatively coupled to a cloud-based computing platform 116 by a network 114.

The cloud-based computing platform 116 includes a processor system 117, a data store 124 for storing data, a software application 126 that is being tested, a connection interface 130, an SOQL interface 140, a test execution engine 150, a tooling API 160, and a code coverage computation unit 170 that is configured to compute code coverage. In one embodiment, the cloud-based computing platform 116 can include all of the elements encompassed within block 116, and in other embodiments, one or more of the elements (e.g., code coverage computation unit 170) may be implemented externally to the cloud-based computing platform 116.

In other embodiments, environment 110 may not have all of the components listed and/or may have other elements instead of, or in addition to, those listed above. For ease of illustration, FIG. 1 shows one block for each of user system 112, processor system 117, and data store 124. The user system 112, processor system 117, and data store 124 may represent multiple user systems, processor systems, and data store units. It should be appreciated that although FIG. 1 illustrates the processor system 117 as a single block that this implementation is for purposes of illustration and is non-limiting. In one embodiment, the connection interface 130, SOQL interface 140, test execution engine 150, and tooling API 160 can each have their own dedicated processor or processor system.

In one embodiment, the cloud-based computing platform 116 can be part of an on-demand database services system that implements a cloud platform. The user system 112 is communicatively coupled to the cloud-based computing platform 116 over the network 114. The cloud-based computing platform 116 uses objects to store data, and enables a user (e.g., via user system 112) to interact with a cloud platform to create and manage data that is stored within data store 124 as system data. For example, the user system 112 can communicate information input by a user to the cloud-based computing platform 116, and the processor system 117 can execute the application 126 to process this information to create objects that can then be stored in data store 124 as system data.

An object is an instance of a class. As used herein, an object can refer to a structure used to store data and associated metadata along with a globally unique identifier that allows for retrieval of the object. As used herein, the term "class" refers to a template or blueprint from which objects are created. To explain further, all objects have state and behavior, that is, things that an object knows about itself, and things that an object can do. A class can contain variables and methods. Variables are used to specify the state of an object, whereas methods are used to control behavior. A class can contain other classes, exception types, and initialization code. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

In one embodiment, the cloud-based computing platform 116 may utilize a development tracking system built on the Salesforce.com's force.com platform using tools such as Visualforce (an XML syntax typically used to generate HTML) and Apex (a proprietary Java-like programming language for Force.com). Objects that are stored can include records associated with code to be integrated into the software application in order to provide changes to the software application.

As used herein, the term "Apex" refers to a strongly typed, object-oriented programming language that allows developers to execute flow and transaction control statements on a Force.com platform server in conjunction with calls to the Force.com API. Force.com applications are built using Apex and Visualforce. Using syntax that looks like Java and acts like database stored procedures, Apex enables developers to add business logic to most system events, including button clicks, related record updates, and Visualforce pages. Apex code can be initiated by Web service requests and from triggers on objects. Apex can be used to add business logic to applications, to write database triggers, and to program controllers in a user interface layer. Apex has a tight integration with the database and query language, good web services support, and includes features such as futures and governors for execution in a multi-tenant environment. Additional details regarding Apex will be briefly summarized below, but additional information can be found in the Apex Developer Guide, Version 36.0, Spring '16, Last Updated: Mar. 3, 2016, which is incorporated by reference herein in its entirety.

The Apex programming language is saved and runs in the cloud on the Force.com multitenant platform. Apex is tailored for data access and data manipulation on the platform, and it enables users to add custom business logic to system events. When a developer writes and saves Apex code to the platform, the platform application server first compiles the code into an abstract set of instructions that can be understood by the Apex runtime interpreter, and then saves those instructions as metadata. When an end-user triggers the execution of Apex (e.g., by clicking a button or accessing a Visualforce page), the platform application server retrieves the compiled instructions from the metadata and sends them through the runtime interpreter before returning the result. The end-user observes no differences in execution time from standard platform requests.

Testing is the key to successful long-term development and is a critical component of the development process. As such, Apex development usually goes hand in hand with unit test development.

Apex provides built-in support for unit test creation and execution, including test results that indicate how much code is covered, and which parts of Apex code could be more efficient. To ensure that all custom Apex code works as expected, Apex code can be tested using a developer console to check code coverage and run Apex tests, including unit tests, functional tests, regression tests, and so on. ApexUnit is a Java application that provides a powerful continuous integration tool for Force.com platform. ApexUnit includes two major components: an xUnit based testing framework for Force.com platform, and extensive code coverage metrics with actionable detail for Apex source code. The xUnit based testing framework leverages the features exposed by the Force.com platform to queue and submit Apex tests (preferably a subset of targeted tests) for execution. For example, unit tests are class methods that verify whether a particular piece of code is working properly. Unit test methods take no arguments, commit no data to the database, send no emails, and are flagged with the testMethod keyword or the isTest annotation in the method definition. Also, test methods must be defined in test classes, that is, classes annotated with isTest. Force.com tooling API's are used for fetching code coverage results. The Force.com platform requires that at least 75% of Apex classes are covered by testing before code can be deployed to a production system.

Referring again to FIG. 1, the connection interface 130 is an interface that is used to establish a communicative connection between the user system 112 and the cloud-based computing platform 116 over the network 114. In one embodiment, the connection interface 130 can be a web services connector (WSC) that is a code-generation tool and runtime library for use with Force.com web services. The WSC uses a high-performing Web services client stack implemented with a streaming parser that can be used with salesforce.com APIs. In accordance with one implementation of the disclose embodiments, a partner connection WSDL can be leveraged to establish connection between cloud-based computing platform 116 and the application 126 and this connection establishes communication channel for data/information exchange between cloud-based computing platform 116 and the application 126.

The Salesforce Object Query Language (SOQL) interface 140 is an interface between the user system 112 and other parts of the cloud-based computing platform 116 including, test execution engine 150, code coverage computation unit 170, and database(s), such as the data store 124 of the cloud-based computing platform 116, which, in one implementation can be a Force.com data store. SOQL is specially optimized version of SQL specially designed for working with Salesforce.com underlying data store. SOQL is a SQL like query language which is used to interact with the data stored as tables in the Force.com database. Salesforce Web services connector provides partner connection utility which facilitates querying for data in Force.com database using the SOQL statements. As will be described in greater detail below, the data store 124 can store data such as test class identifiers, test results, source class identifiers and code coverage metrics (among other things).

The test execution engine 150 executes various tests on a group of test classes that are specified by a user of the user system 112. In accordance with the disclosed embodiments, as will be explained in greater detail below, the test execution engine 150 receives a unique test class identifier array of filtered test class identifiers, and generates test results (e.g., test execution details) that correspond to those filtered test class identifiers that are stored in the data store 124. The test results can then be retrieved from the data store via the SOQL interface 140 and provided to the user system 112. As used herein, the term "test class" refers to a collection of test method(s) that represent a test algorithm to validate the accuracy and functionality of the application algorithm. In a general sense, the test code pertaining to test method(s) or test classes call the source code, to validate the returned output of source code with expected output (also known as assertion).

In accordance with the disclosed embodiments, one function of the tooling API 160 is that it serves as an interface within the cloud-based computing platform 116 to a code coverage computation unit 170 that is used to compute code coverage. The tooling API 160 receives a unique array of filtered source class identifiers that have been specified by a user of the user system 112, and the code coverage computation unit 170 uses these to compute code coverage metrics that correspond to the unique array of source class identifiers. The code coverage computation unit 170 stores the computed code coverage metrics that correspond to the unique array of source class identifiers in the data store 124 so that they can be retrieved by the user system 112 via the tooling API 160. As used herein, the term "source class" refers to a unit of source code of an application, where source code is any collection of computer instructions, possibly with comments, written using some human-readable computer language. As used herein, the term "code coverage" refers to a metric used to describe the degree to which the source code of a program is tested by a particular test run/iteration. To measure what percentage of code has been tested in an iteration, one or more coverage criteria are used. Coverage criteria is usually defined as a rule or requirement; that a test suite needs to satisfy. A program with high code coverage has been more thoroughly tested and has a lower chance of containing software bugs than a program with low code coverage. Many different approaches can be used to calculate code coverage; some of the most basic are the percent of program subroutines and the percent of program statements called during execution of the test suite. In one testing framework code coverage numbers can be generated for Apex source classes and triggers each time one or more tests is run. Code coverage indicates how many executable lines of code in classes and triggers have been tested by the test methods. Test methods are executed to generate code coverage information. In one embodiment, code coverage can be specified as two lists of integers that includes covered lines and uncovered lines. The term "code coverage percentage" refers to the number of covered lines divided by the sum of the number of covered lines and the number of uncovered lines. Additional details regarding the tooling API can be found in the Force.com Tooling API Reference and Developer Guide, Version 36.0, Spring '16, Last Updated: Mar. 3, 2016, which is incorporated by reference herein in its entirety.

The interaction between the user system 112 and various elements that make up the cloud-based computing platform 116 will be described greater detail below with reference to FIGS. 2 through 6.

Figure 2:
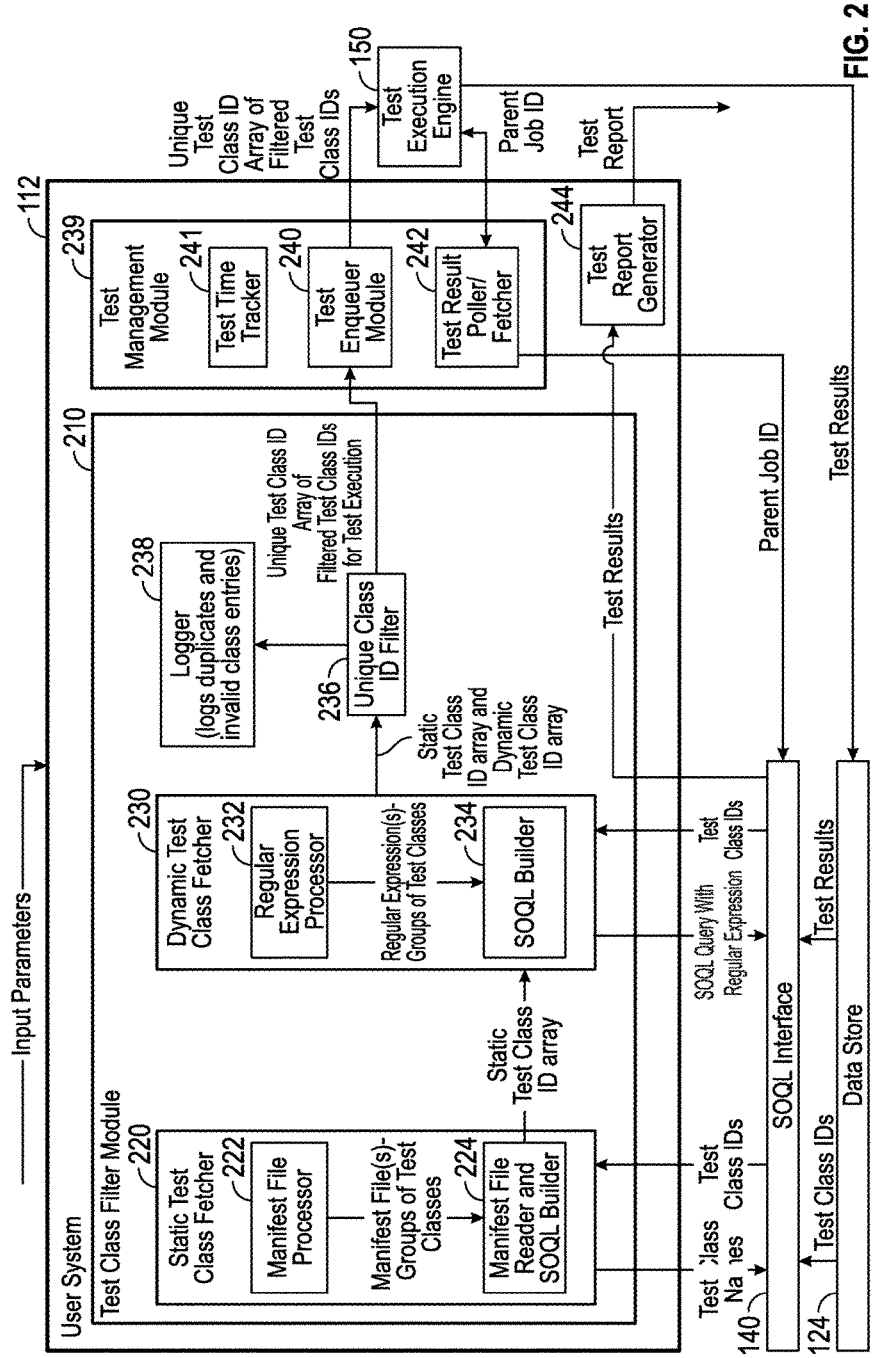
FIG. 2 is a block diagram that shows modules executed by a user system and their interaction with the test execution engine and data store via the SOQL interface of FIG. 1 to execute tests using grouped and filtered test classes in accordance with an embodiment.

FIG. 2 is a block diagram that shows modules 210, 240, 242, 244 executed by a user system 112 and their interaction with the test execution engine 150 and data store 124 via the SOQL interface 140 of FIG. 1 to execute tests using grouped and filtered test classes in accordance with an embodiment. As noted above, the term "test class" refers to a collection of test method(s) that represent a test algorithm to validate the accuracy and functionality of the application algorithm. In general, the test code pertaining to test method(s) or test classes call the source code, to validate the returned output of source code with expected output (e.g., assertion). These modules 210, 240, 242, 244 of the user system 112 include a test class filter module 210, a test management module 239, and a test report generator 244.

The test class filter module 210 allows a user to programmatically select and group a subset of tests that are to be executed at the test execution engine 150 of the cloud-based computing environment 110 to increase productivity during testing. Specifically, the test class filter module 210 allows the user to group and then filter test class identifiers to define the tests that are to be executed at the test execution engine 150. The test class filter module 210 provides an easy way to run multiple, targeted tests at a time, which can in turn increase productivity and efficiency of a user's testing efforts.

The test management module 239 can include a test enqueuer module 240, a test time tracker 241, and a test result poller/fetcher module 242. The test enqueuer module 240 receives a unique test class identifier array of filtered test class identifiers from the test class filter module 210 and communicates test class identifiers (that identify the filtered test classes) as a batch to the test execution engine 150 so that the test execution engine 150 knows the batch of tests that are to be executed. The test time tracker 241 limits the time of each test and automatically aborts any tests that run for longer than a specified amount of time. For example, a user can input user-defined time limits for test execution, and the test time tracker 241 can automatically stop any test that exceeds those user-defined time limits. This way any tests that take too long do not block others that are to be executed.

The test execution engine 150 relays a parent job identifier, used to track test execution, to the test result poller/fetcher 242. The test result poller/fetcher 242 uses a parent job identifier to monitor the progress of the tests that are to be executed at the test execution engine 150 to determine whether all of the tests that are to be executed have been completed. Upon determining that all of the tests that are to be executed have been completed, the test result poller/ fetcher 242 fetches the test results by communicating the parent job identifier to the SOQL interface 140, which retrieves the test results (corresponding to the parent job identifier) from data store 124 and provides the test results to the test report generator 244. The test report generator 244 generates a test report that includes the test execution results for filtered set of test classes.

Figure 3:
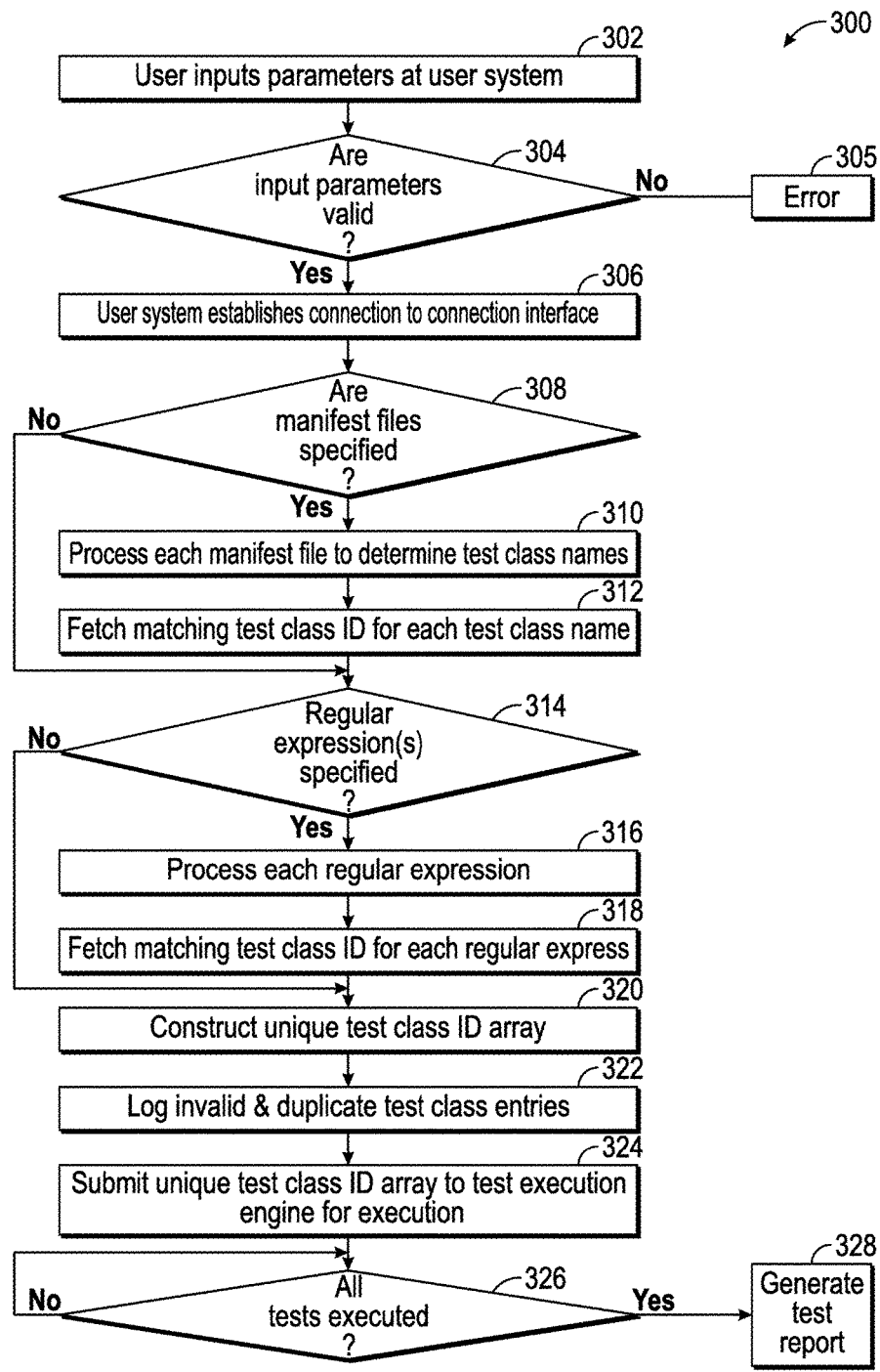
FIG. 3 is a flowchart that illustrates an exemplary method for grouping and filtering test class identifiers and executing tests using the grouped and filtered test class identifiers in accordance with an embodiment.

Tasks performed by the various elements in FIG. 2 will be described in greater detail below with reference to FIG. 3, which is a flowchart that illustrates an exemplary method 300 for grouping and filtering test class identifiers and executing tests using the grouped and filtered test class identifiers in accordance with an embodiment. FIG. 3 will be described with reference to FIGS. 1-2. As a preliminary matter, it should be understood that steps of the method 300 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 300 can be stopped at any time. In certain embodiments, some or all steps of this process, and/or substantially equivalent steps, are performed by execution of processor-readable instructions stored or included on a processor-readable medium, for example. For instance, in the description of FIG. 3 that follows, the user system 112 and the cloud-based computing platform 116 will be described as performing various acts, tasks or steps, but it should be appreciated that this refers to processing system(s) of the user system 112 and the processor system 117 of the cloud-based computing platform 116 executing instructions to perform those various acts, tasks or steps. Depending on the implementation, the processor system 117 of the cloud-based computing platform 116 can be centrally located, or distributed among a number of server systems that work together. Furthermore, in the description of FIG. 3, it will be understood that any actions described as being performed by the user are performed by the user interacting with the user system 112.

Method 300 begins at 302, where a user of the user system 112 can input certain parameters including, for example, user credentials, manifest filenames, regular expressions, test execution time limits, code coverage thresholds, etc.

Users can populate class names in a manifest file and/or provide regular expressions (regexes) to group and filter the Apex test classes. Multiple manifest files can be created for unit tests, functional tests, integration tests etc. As used herein, the term "manifest file" refers to a file that is populated by a user with a group or set of test class names. The list/set/group of class names in each manifest file is statically defined. Each manifest file has a name and includes a group (or set) of test class names for particular iteration of a test run, and is thus used to represent a group (or set) of class names. In other words, each manifest file has a name and a statically defined list of test class names for each test class that is part of the group for that manifest file. Each of the test class names has a corresponding test class identifier that identifies a test class to be executed. Each manifest file can be used to fetch a group (or set) of statically defined test classes identifiers.

The user of the user system can specify one or more of the regular expressions as input parameters. As used herein, the term "regular expression" refers to a pattern (e.g., group keys or key words such as a string value, word, group of words made from combination of any ASCII characters). A regular expression can be used to perform a pattern matching or mapping to one or more test class identifiers associated with that regular expression, where each test class identifier corresponds to a test class name of a test class. Each regular expression can be used to fetch a particular group of test class identifiers that correspond to test class names associated with that regular expression. The pattern matching with a regular expression could either be a prefix, postfix or even a wild card match. Test classes can follow a specific naming convention, that aligns with a regular expression, and enables a target set of test classes, that are associated with that regular expression, to be dynamically selected at runtime.

Inputting multiple manifest files and regular expressions can allow the user to specify unique, targeted combinations of classes that are of interest to that user. This allows the user to consolidate different groups of classes to an uber group used to dynamically fetch the test class identifiers during runtime. As such, the user does not have to know and maintain a static list of test classes. The system is intelligent enough to build a test class set that matches the regular expression(s) pattern specified by the user. This ability to build the list of target test class names (or test class identifiers) can be used to generate the target set of classes dynamically at runtime based on the regular expression(s) defined by the user.

The user system 112 can include a validation module (not shown in FIG. 2) that evaluates (at 304) the input parameters to determine whether or not they are valid (e.g., to confirm that the user has entered valid values for each of the required input parameters). When the validation module determines (at 304) that any of the input parameters are not valid, it can generate an error message (at 305) and communicate the error message to the user of the user system 112 via a user interface of the user system 112.

When the validation module determines that the input parameters are valid, the method 300 proceeds to 306, where the user system 112 initializes command line variables, and establishes (via a flow controller) a connection with the connection interface 130 of the cloud-based computing platform 116.

Once the user system 112 is communicatively coupled with the cloud-based computing platform 116 via the connection interface 130, the user system 112 can instantiate an instance of the test class filter module 210 that is used to group and filter test class identifiers based on input parameters specified by the user of the user system 112. As illustrated in FIG. 2, the test class filter module 210 interfaces with the SOQL interface 140 of the cloud-based computing platform 116. The test class filter module 210 includes a static test class fetcher 220, a dynamic test class fetcher 230, a unique class ID filter 236, and a logger 238.

The static test class fetcher 220 includes a manifest file processor 222 and a manifest file reader and SOQL builder 224. The manifest file processor 222 determines (at 308) whether manifest files were specified/input by the user of the user system 112 when the user entered the input parameters. Multiple manifest files can be created for unit tests, functional tests, integration tests, etc. When the manifest file processor 222 determines (at 308) that manifest files were not specified/input by the user of the user system 112, the method 300 proceeds to 314. When the manifest file processor 222 determines (at 308) that manifest files were specified/input by the user of the user system 112, the method 300 proceeds to 310, where the manifest file processor 222 provides one or more manifest files to the manifest file reader and SOQL builder 224, and the manifest file reader and SOQL builder 224 processes each manifest file to read/extract test class names, which the manifest file reader and SOQL builder 224 sends to the SOQL interface 140. Each manifest file has a name and includes a group (or set) of test class names for particular test run. Each manifest file can be used to fetch a group (or set) of statically defined test class identifiers.

The manifest file reader and SOQL builder 224 reads test class names from each manifest file and sends test class names to the SOQL interface 140. The SOQL interface 140 fetches corresponding test class identifiers from the data store 124 and provides the test class identifiers to the manifest file reader and SOQL builder 224. The manifest file reader and SOQL builder 224 combines the test class identifiers into an array that is referred to herein as "a static test class identifier (ID) array." The manifest file reader and SOQL builder 224 provides the static test class identifier array to the dynamic test class fetcher 230. The static test class identifier array provided from the static test class fetcher 220 will ultimately be used, along with other test class identifiers generated by the dynamic test class fetcher 230, to generate a unique test class ID array of filtered test class identifiers.

The dynamic test class fetcher 230 includes a regular expression processor 232 and a SOQL builder 234. The regular expression processor 232 determines (at 314) whether regular expressions were specified/input by the user of the user system 112 when the user entered the input parameters.

When the regular expression processor 232 determines (at 314) that regular expressions were not specified/input by the user of the user system 112, the method 300 proceeds to 320. However, if the regular expression processor 232 determines (at 314) that one or more regular expressions were specified/input by the user of the user system 112, the method 300 proceeds to 316, where the regular expression processor 232 provides one or more regular expressions to the SOQL builder 234.

The SOQL builder 234 processes each regular expression to generate an SOQL query with that regular expression, and sends the SOQL query with that regular expression to the SOQL interface 140. At 318, for each regular expression, the SOQL interface 140 contacts the data store 124 and finds the matching test class names, and returns the corresponding test class identifiers for the matching test class names (that were retrieved from the data store 124) to the SOQL builder 234. The SOQL builder 234 combines the test class identifiers into an array that is referred to herein as "a dynamic test class identifier array." The dynamic test class identifier array is then sent to the unique class ID filter 236, along with the static test class identifier array that was provided from the static test class fetcher 220.

At 320, the unique class ID filter 236 uses the dynamic test class identifier array and the static test class identifier array to generate a unique test class ID array of filtered test class identifiers that can be used during further processing by the test execution engine 150. In the event that the unique class ID filter 236 determines that both the dynamic test class identifier array and the static test class identifier array were empty, then it generates an error that is communicated to the user via a user interface of the user system 112 instructing the user to input a manifest file or regular expression to correct the problem so that the unique test class ID array of filtered test class identifiers can be generated. The unique test class ID array of filtered test class identifiers includes a subset of test class identifiers that have been grouped or selected (via the static test class fetcher 220 and dynamic test class fetcher 230) based on user inputs and then filtered by the unique class ID filter 236. For example, in one embodiment, the unique class ID filter 236 processes the two different test class ID arrays to identify invalid class entries from either one of the test class ID arrays, and to identify any duplicate test class IDs that are in common in the two class test class ID arrays. At 322, the logger 238 crates a log of any duplicates or any invalid class entries. For example, in one embodiment, the unique class ID filter 236 combines the test class identifiers from the static test class identifier array and the test class identifiers from the dynamic test class identifier array into a combined set of test class identifiers, and then identifies any invalid class IDs from either one of the test class ID arrays, and to identifies any duplicate test class IDs that are in common in the two class test class ID arrays. The unique class ID filter 236 can then eliminate the duplicate test class identifiers and the invalid test class identifiers from the combined set to generate the unique test class identifier array of filtered test class identifiers.

At 324, the unique class ID filter 236 can submit the unique test class identifier array to a test enqueuer module 240, which provides the unique test class identifier array to the test execution engine 150. The test execution engine 150 uses the test class identifiers from the unique test class identifier array to determine which tests to execute. In other words, the test execution engine 150 uses this array of filtered test class identifiers to execute a particular subset of tests of all possible tests that could be executed. In response to receiving the unique test class ID array, the test execution engine 150 provides a parent job identifier (ID) to the test result poller/fetcher 242.

The test result poller/fetcher 242 uses the parent job identifier to track status of the test execution so that the test result poller/fetcher 242 can determine when all of the tests (corresponding to the filtered test class identifiers specified in the unique test class identifier array) have been completed. The test result poller/fetcher 242 regularly polls the test execution engine 150 using the parent job ID to determine (at 326) whether all the tests associated with this parent job ID have been executed/completed. When the test result poller/fetcher 242 determines (at 326) that all of the tests have not yet been executed by the test execution engine 150, the method 300 loops at 326; however, in some embodiments, the loop at 326 can be limited by a timer or counter to prevent the loop from running indefinitely. For example, in one embodiment, the test time tracker 241 can maintain a clock that times how long each test has run for since the start of execution. When the test time tracker 241 determines that a test has run for a time limit since the start of execution, then the test time tracker 241 can issue an instruction to terminate that test and/or generate/record an error message indicating that this test has failed.

When the test result poller/fetcher 242 determines (at 326) that all of the tests (corresponding to the filtered test class identifiers specified in the unique test class identifier array) have been executed by the test execution engine 150, the test result poller/fetcher 242 provides the parent job identifier to the SOQL interface 140 as part of a request for the test results. The SOQL interface 140 can then retrieve the test results from the data store 124, and provide the retrieved test results to a test report generator 244. The test report generator 244 then generates a test report at 328 based on the test results.

Figure 4:
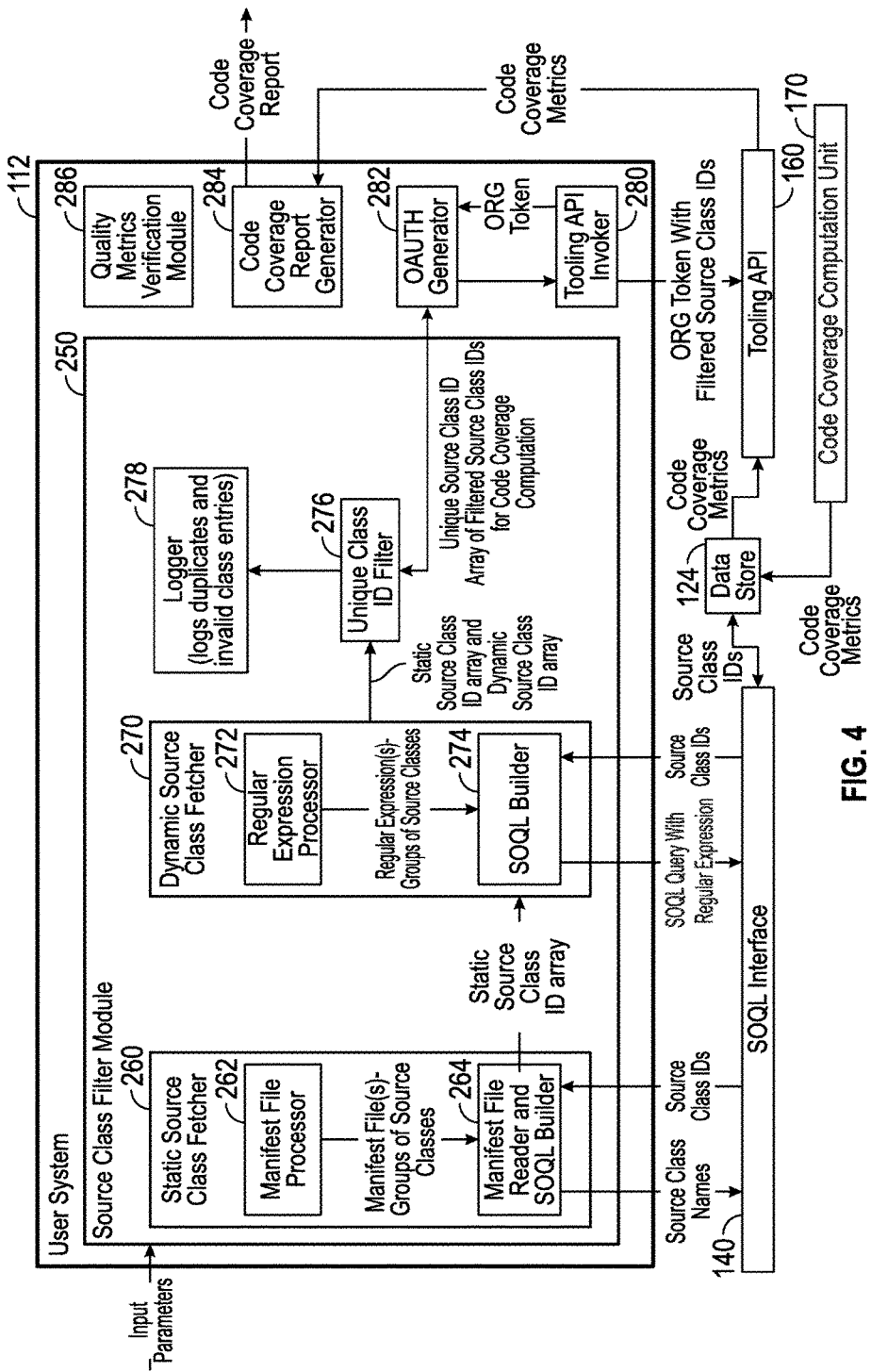
FIG. 4 is a block diagram that shows other modules executed by the user system and their interaction with the SOQL interface, tooling API, code coverage computation unit and data store of FIG. 1 to generate code coverage metrics using grouped and filtered source class identifiers in accordance with an embodiment.

FIG. 4 is a block diagram that shows other modules 250, 280, 282, 284, 286 executed by the user system 112 and their interaction with the SOQL interface 140, tooling API 160, code coverage computation unit 170 and data store 124 of FIG. 1 to generate code coverage metrics using grouped and filtered source class identifiers in accordance with an embodiment. As noted above, the term "source class" refers to a unit of source code of an application. Modules 250, 280, 282, 284, 286 of the user system 112 include a source class filter module 250, a tooling API invoker 280, an OAuth generator 282, a code coverage report generator 284, and a quality metrics verification module 286.

The source class filter module 250 allows a user to programmatically select a subset of source class identifiers that are to be provided to the code coverage computation unit 170 and used during code coverage computations to improve precision of code coverage analysis. Specifically the source class filter module 250 allows a user to group and filter source class identifiers that specify which source classes "targeted" code coverage metrics are to be computed for, and provides the user-selected subset of source class identifiers to the code coverage computation unit 170 (via the tooling API interface 160) for use during code coverage computations. In essence this allows the user to select (via input parameters specified by the user) a subset of the code base that code coverage metrics are to be computed for. By allowing the user to group and filter the source classes for which the user wants to exercise code coverage computations, the source class filter module 250 provides an easy way to specify highly-targeted sets of source classes to be used during code coverage computations, which can in turn increase productivity and efficiency of the user's code coverage analysis and testing.

The tooling API invoker 280 communicates with the OAuth generator 282 to obtain an organization token from the OAuth generator 282 for the particular session. OAuth is an open standard for authorization that provides to clients a secure delegated access to server resources on behalf of a resource owner. OAuth standards specify a process for resource owners to authorize access to their server resources without sharing their credentials. OAuth allows access tokens to be issued to clients by an authorization server, with the approval of the resource owner. The client can then use the access token to access the protected resources hosted by the resource server. The tooling API invoker 280 provides the organization token to the tooling API 160 to establish a session with the tooling API 160. The tooling API invoker 280 receives a unique source class identifer (ID) array of filtered source class identifiers are specified by the user using manifest files and/or regular expressions, and provides the filtered source class identifiers (from the unique source class identifier array) to the tooling API 160.

The tooling API 160 interfaces with a code coverage computation unit 170 that computes code coverage metrics for the source classes that correspond to the filtered set of source class identifiers. The source classes, that correspond to the filtered source class identifiers specified in the unique source class identifier (ID) array, correspond to a subset of the code base that the user specifies by inputting a combination of manifest file(s) and/or regular expression(s). The code coverage metrics specify the amount of source code that is covered by certain tests and shows how thoroughly the chosen subset of code has been tested. The code coverage computation unit 170 stores the code coverage metrics in the data store 124. The tooling API 160 can retrieve and provide the code coverage metrics for the filtered set of source classes to the code coverage report generator 284.

The code coverage report generator 284 uses the code coverage metrics for the source classes to generate an HTML report. The report includes all of the code coverage metrics for the filtered set of source classes consolidated into an actionable report. The user can control the granularity of the report (in terms of how the code coverage metrics are consolidated) by specifying code coverage results down to complex modules (and even line numbers) for developers.

Processes performed by the various elements in FIG. 4 will be described in greater detail below with reference to FIGS. 5A and 5B, which collectively illustrate a flowchart that illustrates an exemplary method 500 for grouping and filtering source class identifiers and generating code coverage metrics using grouped and filtered source class identifiers in accordance with an embodiment. FIGS. 5A and 5B will be described with reference to FIGS. 1-4. As a preliminary matter, it should be understood that steps of the method 500 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 500 can be stopped at any time. In certain embodiments, some or all steps of this process, and/or substantially equivalent steps, are performed by execution of processor-readable instructions stored or included on a processor-readable medium, for example. For instance, in the description of FIGS. 5A and 5B that follows, the user system 112 and elements of the cloud-based computing platform 116 will be described as performing various acts, tasks or steps, but it should be appreciated that this refers to processing system(s) of the user system 112 and the processor system 117 of the cloud-based computing platform 116 executing instructions to perform those various acts, tasks or steps. Depending on the implementation, the processor system 117 of the cloud-based computing platform 116 can be centrally located, or distributed among a number of systems that work together. Furthermore, in the description of FIGS. 5A and 5B, it will be understood that any actions described as being performed by the user are performed by the user interacting with the user system 112.

Method 500 begins at 502, where a user of the user system 112 can input certain parameters including, for example, user credentials, manifest filenames, regular expressions, test execution time limits, code coverage thresholds, etc.

The user system 112 can include a validation module (not shown in FIG. 4) that evaluates (at 504) the input parameters to determine whether or not they are valid (e.g., to confirm that the user has entered valid values for each of the required input parameters). When the validation module determines (at 504) that any of the input parameters are not valid, it can generate an error message (at 505) and communicate the error message to the user of the user system 112 via a user interface of the user system 112.

When the validation module determines that the input parameters are valid, the method 500 proceeds to 506, where the user system 112 initializes command line variables, and establishes (via a flow controller) a connection with the connection interface 130 of the cloud-based computing platform 116.

Once the user system 112 is communicatively coupled with the cloud-based computing platform 116 via the connection interface 130, at 506, the user system 112, can instantiate an instance of the source class filter module 250 that interfaces with the SOQL interface 140 of the cloud-based computing platform 116. As illustrated in FIG. 4, the source class filter module 250 includes a static source class fetcher 260, a dynamic source class fetcher 270, a unique class ID filter 276, and a logger 278.

The static source class fetcher 260 includes a manifest file processor 262 and a manifest file reader and SOQL builder 264. The manifest file processor 262 determines (at 508) whether manifest files were specified/input by the user of the user system 112 when the user entered the input parameters. When the manifest file processor 262 determines (at 508) that manifest files were not specified/input by the user of the user system 112, the method 500 proceeds to 514.

When the manifest file processor 262 determines (at 508) that manifest files were specified/input by the user of the user system 112, the method 500 proceeds to 510, where the manifest file processor 262 provides one or more manifest files to the manifest file reader and SOQL builder 264, and the manifest file reader and SOQL builder 264 processes each manifest file to read/extract source class names specified in that manifest file, and sends the source class names to the SOQL interface 140. Each manifest file has a name and includes a group (or set) of source class names for each source class that is part of that manifest file. Each manifest file can be used to fetch a group (or set) of statically defined source class identifiers.

The SOQL interface 140 uses the source class names to fetch corresponding source class identifiers (IDs) from the data store 124 and provides the retrieved source class identifiers to the manifest file reader and SOQL builder 264. The manifest file reader and SOQL builder 264 combines the source class identifiers into an array that is referred to herein as "a static source class identifier array."

The manifest file reader and SOQL builder 264 provides the static source class identifier array to the dynamic source class fetcher 270. The static source class identifier array provided from the static source class fetcher 260 can then be used along with other dynamic source class identifiers (described below) generated by the dynamic source class fetcher 270 to generate a unique source class ID array of filtered source class identifiers.

The dynamic source class fetcher 270 includes a regular expression processor 272 and a SOQL builder 274. The regular expression processor 272 determines (at 514) whether one or more regular expressions were specified/input by the user of the user system 112 when the user entered the input parameters. The user can input more than one such regular expressions (as input parameters) to consolidate different groups of source classes to an uber group that can be used to dynamically fetch the source class identifiers during runtime. Each regular expression is a pattern (e.g., group keys or key words such as a string value, word, group of words made from ASCII characters) that can be processed to perform a pattern matching or mapping to one or more source class names that correspond a particular group of source classes. The power that this capability provides on top of manifest file approach is that user does not have to know and maintain the static list of source classes. The system is intelligent enough to build the source class set that match the regular expression(s) specified by the user. When the regular expression processor 272 determines (at 514) that regular expressions were not specified/input by the user of the user system 112, the method 500 proceeds to 520.

When the regular expression processor 272 determines (at 514) that regular expressions were specified/input by the user of the user system 112, the method 500 proceeds to 516, where the regular expression processor 272 provides one or more regular expressions to the SOQL builder 274. The SOQL builder 274 processes each regular expression to generate an SOQL query with that regular expression, and sends the SOQL query with that regular expression to the SOQL interface 140.

At 518, for each regular expression, the SOQL interface 140 contacts the data store 124 and finds the matching source class names, and returns the corresponding source class identifiers for the matching source class names (that were retrieved from the data store 124) to the SOQL builder 274. The SOQL builder 274 combines the source class identifiers into an array that is referred to herein as "a dynamic source class identifier array." The dynamic source class identifier array is then sent to the unique class ID filter 276, along with the static source class identifier array that was provided from the static source class fetcher 260.

At 520, the unique class ID filter 276 uses the dynamic source class identifier array and the static source class identifier array to generate a unique source class identifier (ID) array of filtered source class identifiers that can be used during further processing during a code coverage computation. For example, in one embodiment, the unique class ID filter 276 combines the source class identifiers from the static source class identifier array and the source class identifiers from the dynamic source class identifier array into a combined set of source class identifiers, and then identifies any invalid class entries from either one of the source class ID arrays, and identifies any duplicate source class IDs that are in common in the two class source class ID arrays. The unique class ID filter 276 can then eliminate the duplicate source class identifiers and the invalid source class identifiers from the combined set to generate the unique source class identifier array of filtered source class identifiers. At 522, the logger 278 creates a log of any duplicates or any invalid class entries.

The unique class ID filter 276 can submit the unique source class identifier array to a tooling API invoker 280 via the OAuth generator 282. The tooling API invoker 280 requests an organization token from the OAuth generator 282, and the OAuth generator 282 provides the organization token to the tooling API invoker 280. The tooling API invoker 280 then sends the organization token and the unique source class identifier array to the tooling API 160. The tooling API 160 and the tooling API invoker 280 of the user system 112 use the organization token to establish a session between the tooling API invoker 280 and the tooling API 160. In other words, the organization token authorizes the tooling API invoker 280 to communicate with the tooling API 160.

At 524, the tooling API 160 provides the source class identifiers from the unique source class identifier array to the code coverage computation unit 170, and the code coverage computation unit 170 uses source class identifiers from the unique source class identifier array to compute targeted code coverage metrics. In one implementation, the code coverage computation unit 170 can also compute organization wide code coverage metrics for all source class IDs. The "organization wide code coverage metrics" are code coverage metrics that indicate code coverage for the entire organization, whereas the "targeted code coverage metrics" are code coverage metrics that are specific to only the filtered source classes specified via the source class identifiers that are specified in the unique source class ID array. For instance, the targeted code coverage metrics can be a subset of code coverage metrics that are of interest to a specific group such as a specific sub-tenant or group of sub-tenants, such as a specific business unit or functional group. The code coverage computation unit 170 can store the computed organization wide code coverage metrics and targeted code coverage metrics in the data store 124. The tooling API 160 can receive the code coverage metrics from the data store 124, and then provide the organization wide code coverage metrics and targeted code coverage metrics to the code coverage report generator 284.

At 526, the code coverage report generator 284 then generates a consolidated report that includes the various code coverage metrics, and optionally test results that were generated (as described above) by the test report generator 244 of FIG. 2.

FIG. 6 is a screenshot of an example of a consolidated report that can be displayed at a user interface of the user system 112 in accordance with one exemplary implementation of an embodiment. In this embodiment, the consolidated report can include test results from the test report and the code coverage metrics. The consolidated "ApexUnit" report can include a code coverage summary 610 indicating what the computed team code coverage was determined to be along with the customized team code coverage threshold, and what the computed organization wide code coverage was determined to be along with the customized organization wide code coverage threshold. The consolidated report can also include a test execution summary 620 that indicates how many total test classes were executed during testing, how many total test methods were executed during testing, how many total test methods passed during testing, and how many total test methods failed during testing. The consolidated report can also include an Apex Test Report 630 that includes a hyperlink to a Detailed Test Report (not shown) that includes test results. Upon navigating to the hyperlink, it renders detailed test execution metrics with high level summary of how many test passed and how many failed. It provides a drill down scenario to dig deep into the failed test cases citing related logs and information of specific failure in a drill down fashion. The consolidated report can also include a Detailed Code Coverage report 640. The Detailed Code Coverage report includes a table 640 with columns for Apex Class Name, API Version, Percent Code Coverage, number of covered lines, number of uncovered lines, a list of covered lines, a list of uncovered lines, and length without comments (Bytes). The Detailed Code Coverage report also includes a list 650 of duplicate Apex class names across manifest files and regular expressions. The Detailed Code Coverage report 640 also includes a list 660 of invalid (or non-existent) Apex class names across manifest files and regular expressions.

Referring again to FIG. 5B, at 528, the quality metrics verification module 286 can determine whether quality metrics or measures have been verified. To determine whether quality measures are verified, the quality metrics verification module can validate test results and code coverage metrics. In one embodiment, validation of test results refers to determining if any of the tests that were to be executed by the test execution engine 150 have failed (e.g., not completed). If the quality metrics verification module determines that any of the tests that were to be executed by the test execution engine 150 failed, the quality metrics verification module 286 generates an error message and communicates the error message to the user of the user system 112 via a user interface of the user system 112. If all of the tests that were to be executed by the test execution engine 150 have successfully completed, then the quality metrics verification module 286 validates to the code coverage results by determining if whether code coverage is greater than or equal to a user-specified code coverage threshold (e.g., 75% in one implementation).

When the quality metrics verification module 286 determines, based on the code coverage metrics, that code coverage is greater than or equal to a user-specified code coverage threshold, then the code coverage is determined to be valid. When the quality metrics verification module 286 determines, based on the code coverage metrics, that code coverage is less than the user-specified code coverage threshold, then the code coverage is determined to be invalid and the quality metrics verification module 286 generates an error message and communicates the error message to the user of the user system 112 via a user interface of the user system 112. Thus, when the quality metrics verification module 286 determines that the test results or the code coverage metrics are unacceptable, the method 500 proceeds to 530. At 530, the quality metrics verification module 286 can generate an error message and communicate the error message to the user of the user system 112 via a user interface of the user system 112. When the quality metrics verification module 286 determines that both the test results and the code coverage metrics are acceptable, the method proceeds to 532, where the method 500 ends.

FIG. 7 is a schematic block diagram of a user system in accordance with an embodiment. FIG. 7 will be described with reference to FIGS. 1-5. The user system 112 can include one or more processing system(s) 702, main memory 704, a network interface device (NID) 710, a chipset 712, input systems 716, and output systems 718. It will be appreciated that the user system 112 may not include all of the components shown in FIG. 7, may include other components that are not explicitly shown in FIG. 7, or may utilize an architecture completely different than that shown in FIG. 7.

The chipset 712 is usually located on a motherboard of the user system 112. The chipset 712 is a set of electronic components (e.g., in an integrated circuit) that interconnects and manages the data flow between the processing system(s) 702 and other elements of the user system 112 and any peripherals that are connected to the user system 112. For instance, the chipset 712 provides an interface between the processing system(s) 702 and the main memory 704, and also includes functionality for providing network connectivity through the NID 710, such as a gigabit Ethernet adapter. The chipset 712 typically contains the processor bus interface (also known as a front-side bus), memory controllers, bus controllers, I/O controllers, etc.

Processing system(s) 702 represents one or more general-purpose processing devices such as a microprocessor, central processing unit, or the like. More particularly, the processing system(s) 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 702 may also be one or more special-purpose processing devices such as an application specific integrated circuit (ASIC), a field programmable gate array (FPGA), a digital signal processor (DSP), network processor, or the like.

The processing system(s) 702 can include one or more central processing units ("CPUs") that operate in conjunction with the chipset 712. The processing system(s) 702 perform arithmetic and logical operations necessary for the operation of the user system 112. The processing system(s) 702 can perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The NID 710 is capable of connecting the user system 112 to other computers over the network 114. The network 114 can be an Ethernet or Gigabyte Ethernet LAN, a fiber ring, a fiber star, wireless, optical, satellite, a WAN, a MAN, or any other network technology, topology, protocol, or combination thereof.

Input system(s) 716 (or input device(s)) allow the user to input information to the user system and can include things such as a keyboard, a mouse or other cursor pointing device, a pen, a voice input device, a touch input device, a webcam device, a microphone, etc. Output system(s) 718 (or output device(s)) present information to the user of the user system and can include things such as a display, monitor, speakers, or the like. All of these systems/devices are well known in the art and need not be discussed at length here.

The chipset 712 can provide an interface to various forms of computer-readable storage media including a main memory 704 (e.g., read-only memory (ROM), flash memory, dynamic random access memory (DRAM) such as synchronous DRAM (SDRAM), a hard disk, etc.). The processing system(s) 702 can communicate with the various forms for computer-readable storage media via the chipset 712 and appropriate buses.

The main memory 704 may be composed of many different types of memory components. The main memory 704 can include non-volatile memory (such as read-only memory (ROM) 706, flash memory, etc.), volatile memory (such as random access memory (RAM) 708), or some combination of the two. The RAM 708 can be any type of suitable random access memory including the various types of dynamic random access memory (DRAM) such as SDRAM, the various types of static RAM (SRAM). The main memory 704 (as well as the processing system(s) 702) may be distributed throughout the user system 112.

The ROM 706 of the main memory 704 can be used to store firmware that includes program code containing the basic routines that help to start up the user system 112 and to transfer information between elements within the user system 112. The ROM of the main memory 704 may also store other software components necessary for the operation of the user system 112.

The RAM 708 stores programs/instructions 730 or executable code for one or more programs that can be loaded and executed at processing system(s) 702 to perform various functions. The programs/instructions 730 are computer readable program code that can be stored in RAM 708 (or other a non-transitory computer readable medium of the user system 112) that can be read and executed by processing system(s) 702 to perform various acts, tasks, functions, and steps as described herein. Examples of programs/instructions 730 that are stored in the RAM 708 include a test class filter module 210, a test enqueuer module 240, a test result poller/fetcher 242, a test report generator 244, a source class filter module 250, a tooling API invoker 280, an OAuth generator 282, a code coverage report generator 284, and a quality metrics verification module 286 in accordance with the embodiments described herein.

Various functions performed by the processing system(s) 702 upon loading and executing the test class filter module 210, the test enqueuer module 240, the test result poller/fetcher 242, the test report generator 244, the source class filter module 250, the tooling API invoker 280, an OAuth generator 282, the code coverage report generator 284, and the quality metrics verification module 286 have been described above with reference to FIGS. 1-6 and will not be repeated here for sake of brevity.

FIG. 8 illustrates a block diagram of an example environment 810 in which the embodiments described herein may be implemented. Environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database system. For example, any of user systems 812 can be a handheld computing device, a mobile phone, a laptop computer, a work station, and/or a network of computing devices. As illustrated in FIG. 8 (and in more detail in FIG. 9) user systems 812 might interact via a network 814 with an on-demand database service, which is system 816. System 816 may also be referred to as a cloud service provider. System 816 provides its resources to customers (e.g., end users) as a service.

An on-demand database service, such as system 816, is a database system that is made available to outside users who do not need to necessarily be concerned with building and/or maintaining the database system, but instead may be available for more general use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, system 816 may include an application platform 818 that enables creating, managing, and executing one or more applications developed for an on-demand database service, for users accessing the on-demand database service via user systems 812, or for third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global internetwork of networks often referred to as the "Internet" with a capital "I." That network will be used in many of the examples herein. However, it should be understood that the networks used with the embodiment described herein use are not so limited, although TCP/IP is a frequently implemented protocol.

User systems 812 might communicate with system 816 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as to provide related data, code, forms, webpages and other information to and from user systems 812. The application servers are also configured to store to, and retrieve from, a database system related data, objects, and Webpage content. With a multi-tenant system, data for multiple tenants may be stored in the same physical database object. Tenant data may be arranged such that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party application developer) software applications, which may or may not include CRM, may be supported by the application platform 818, which manages the creation and storage of the applications into one or more database objects, and executing of the applications in a virtual machine in the process space 828 of the system 816. The terms "application," "software application," "software package," "software code," and "program code" are used interchangeably.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Google's Chrome browser, Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application(s) including computer code to run using a central processing unit such as processor system 817, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 9 illustrates a block diagram of another example environment 810, which may be used to implement the embodiments described herein. Some of the elements in FIG. 9 overlap with those in FIG. 8, and therefore FIG. 9 will be described with reference to FIG. 8, and common numbering will be used for elements in FIG. 9 that are shown in FIG. 8. FIG. 9 also illustrates elements of system 816 and various interconnections, according to one embodiment. FIG. 9 shows that user system 812 may include processor system 812A (analogous to processing system(s) 702 in FIG. 7), memory system 812B (analogous to main memory 704 in FIG. 7), input system 812C (analogous to input system(s) 716 in FIG. 7), and output system 812D (analogous to output system(s) 718 in FIG. 7). FIG. 9 shows network 814 and system 816. FIG. 9 also shows that system 816 may include tenant data storage 822, tenant data 823, system data storage 824, system data 825, user interface (UI) 930, application program interface (API) 932, PL/Salesforce.com object query language (PL/SOQL) 934, save routines 936, application setup mechanism 938, applications servers $900_1$-$900_N$, system process space 902, tenant process spaces 904, tenant management process space 910, tenant storage area 912, user storage for tenant data 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown in FIG. 8, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to access tenant data storage 822 and the tenant data 823 therein, and system data storage 824 and the system data 825 therein to serve requests of user systems 812. The tenant data 823 might be divided into individual tenant storage areas 912, which can be either a physical arrangement and/or a logical arrangement of data. Within each tenant storage area 912, user storage 914 and application metadata 916 might be similarly allocated for each user. For example, a copy of a user's most recently used (MRU) items might be stored to user storage 914. Similarly, a copy of MRU items for an entire organization that is a tenant might be stored to tenant storage area 912. A UI 930 provides a user interface and an API 932 provides an application programmer interface to system 816 resident processes and to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 904 managed by tenant management process 910, for example. Invocations to such applications may be coded using PL/SOQL 934 that provides a programming language style interface extension to API 932. Invocations to applications may be detected by one or more system processes, which manage retrieving application metadata 916 for the subscriber, making the invocation and executing the metadata as an application in a virtual machine.

Each application server 900 may be communicably coupled to database systems, e.g., having access to system data 825 and tenant data 823, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer control protocol and Internet protocol (TCP/IP) are typical protocols for communicating between application servers 900 and the database system. However, it will be apparent to one skilled in the art that other transport protocols may be used to optimize the system depending on the network connection used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multitenant, wherein system 816 handles the storage of, and access to, different objects, data and applications across disparate users and organizations.

As an example of storage, one tenant might be a company that employs a sales force where each salesperson uses system 816 to manage his or her sales process. Thus, a user might maintain contact data, leads data, customer follow-up data, performance data, goals and progress data, etc., all applicable to that user's personal sales process (e.g., in tenant data storage 822). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more structured query language (SQL) statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the embodiments described herein. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 10 illustrates a block diagram of sub-tenant process spaces 904-1 . . . 904-N that can be defined within one of the tenant process spaces 904 of FIG. 9 to explain the concept of sub-multi-tenancy in accordance with an embodiment. Further defining sub-tenant process spaces 904-1 . . . 904-N within one of the tenant process spaces 904 can be thought of as sub multi-tenancy within a tenant of a multi-tenant system. The disclosed embodiments can address challenges posed by multi-tenant environment in which multiple sub-tenants (e.g., teams, business units or functional groups) use common space to store their test results and code coverage metrics.

For example, in a cloud-based system that provides a multi-tenant application that is being tested, each manifest file can include a statically defined set of test class names each having a corresponding test class identifier that identifies a test class to be executed, and each regular expression is a pattern that is used to perform a pattern match to identify a particular group of one or more test class names that correspond to one or more test classes associated with that regular expression. The user specifies particular manifest file(s) and regular expression(s) to define a targeted set/group of test class names that are of interest to a particular sub-tenant (or group of sub-tenants) of the multi-tenant application during testing of the multi-tenant application. Stated differently, the filtered test class identifiers specified via the unique test class identifier array correspond to a subset of all possible test classes that have been defined by the particular sub-tenant (or group of sub-tenants) within a tenant of multi-tenant cloud application, and the subset of all possible test classes are those that are of interest to that particular sub-tenant (or group of sub-tenants) and correspond to the particular subset of tests (of all possible tests that could be executed) that are to be executed during testing of the multi-tenant application. In this way, the set of test class names collectively represent a particular, targeted subset of tests that are of interest or pertain to that particular sub-tenant (or group of sub-tenants) within a tenant of multi-tenant cloud application, such as a specific business unit or functional group. By providing each user with the ability to group and filter test classes, a particular sub-tenant (within a tenant of multi-tenant cloud application) can selectively define which test classes are of interest, so that the particular sub-tenant can select a particular subset of targeted tests that are to be executed to generate only those target test results that are of interest or pertinent to that particular sub-tenant.

Similarly, by providing each user with the ability to group and filter source classes, a particular sub-tenant can selectively define which source classes are of interest, so that the particular sub-tenant can compute code coverage metrics for a particular subset of targeted source classes (of all possible source classes) to generate targeted code coverage metrics that are of interest or pertinent to that particular sub-tenant. For instance, the targeted code coverage metrics can be a particular subset of code coverage metrics that are of interest or pertinent to a specific group such as a specific sub-tenant or group of sub-tenants, such as a specific business unit or functional group.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor," "processor system," or "processing system" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A system, comprising:
a user system, comprising:
an input system configured to receive input parameters specified by a user of the user system, wherein the input parameters comprise: one or more regular expressions specified by the user of the user system, wherein each regular expression is a pattern that is used to perform a pattern match to identify a particular group of one or more first test class identifiers associated with that regular expression that each correspond to a test class name of a test class;
a processing system; and
a memory configured to store: a test class filter module executable by the processing system, wherein the test class filter module, upon being executed by the processing system, is configured to: group and filter test class identifiers, based on one or more of the input parameters, to generate a unique test class identifier array of filtered test class identifiers that correspond to a particular subset of tests that are to be executed during testing of an application, wherein the test class filter module comprises:
a first test class fetcher comprising:
a regular expression processor configured to receive the regular expressions input by the user of the user system; and
a query builder configured to: generate and send a query associated with each regular expression to an interface, wherein the interface is configured to receive each query, contact a data store and find matching test class names for each regular expression, and return a first test class identifier for each of the matching test class names to the query builder, and wherein the query builder is further configured to receive the first test class identifiers for each of the matching test class names, and group the first test class identifiers corresponding to each of the regular expressions into a first test class identifier array,
wherein the test class filter module further comprises:
a unique class ID filter configured to: receive the first test class identifier array and a second test class identifier array; and filter the one or more first test class identifiers from the first test class identifier array and second test class identifiers from the second test class identifier array to generate the unique test class identifier array of filtered test class identifiers by: combining the first test class identifiers from the first test class identifier array and the second test class identifiers from the second test class identifier array into a combined set of test class identifiers; determining duplicate test class identifiers that are in the combined set; determining invalid test class identifiers that are in the combined set; and eliminating the duplicate test class identifiers and the invalid test class identifiers from the combined set to generate the unique test class identifiers array of filtered test class identifiers that correspond to the particular subset of tests that are to be executed; and
a cloud-based computing platform, communicatively coupled to the user system, and comprising:
a test execution engine configured to execute the particular subset of tests corresponding to the filtered test class identifiers specified in the unique test class identifier array.

2. The system according to claim 1, wherein the cloud-based computing platform further comprises: the interface that interfaces with the test class filter module, wherein the input parameters further comprise: a manifest file specified by the user of the user system, and wherein the test class filter module further comprises:
a second test class fetcher comprising:
a manifest file processor configured to: retrieve the manifest file specified by the user of the user system, wherein the manifest file comprises a plurality of test class names that can be used to fetch a particular group of one or more second test class identifiers from the data store of the cloud-based computing platform; and
a manifest file reader and query builder configured to: read the test class names from the manifest file, send the test class names from the manifest file to the interface, receive the one or more second test class identifiers corresponding to each of the test class names from the manifest file from the interface, and group the second test class identifiers into the second test class identifier array.

3. The system according to claim 2, wherein the manifest file has a name, and wherein the plurality of test class names in the manifest file comprises:
a statically defined set of test class names each having a corresponding second test class identifier that identifies a test class to be executed.

4. The system according to claim 3, wherein the application is a multi-tenant application, and wherein the user selects the manifest file to specify the statically defined set of test class names that are of interest to a particular sub-tenant of the multi-tenant application during testing of the multi-tenant application.

5. The system according to claim 1, wherein the application is a multi-tenant application, and wherein the user selects the one or more regular expressions to specify a particular group of one or more test class names that are of interest to a particular sub-tenant of the multi-tenant application during testing of the multi-tenant application.

6. The system according to claim 1, wherein the unique test class identifier array of filtered test class identifiers correspond to a particular subset of all possible test classes that have been defined by the user via the input parameters.

7. The system according to claim 6, wherein the application is a multi-tenant application, wherein the user is a sub-tenant, and wherein the particular subset of all possible test classes are those that are of interest to that particular sub-tenant and correspond to the particular subset of tests that are to be executed during testing of the multi-tenant application.

8. The system according to claim 1, wherein the memory is further configured to store a test management module comprising:
a test enqueuer module executable by the processing system, wherein the test enqueuer module, upon being executed by the processing system, is configured to:
receive the unique test class identifier array of filtered test class identifiers from the test class filter module; and
communicate the filtered test class identifiers as a batch to the test execution engine, wherein the test execution engine is configured to execute the particular subset of tests corresponding to each of the filtered test class identifiers specified in the unique test class identifier array; and
a test result poller/fetcher executable by the processing system, wherein the test result poller/fetcher, upon being executed by the processing system, is configured to:
receive, from the test execution engine, a parent job identifier used to track test execution status of the particular subset of tests corresponding to each of the filtered test class identifiers that are to be executed at the test execution engine;
use the parent job identifier to poll the test execution engine to monitor the progress of the particular subset of tests; and
when the test result poller/fetcher determines that all tests in the particular subset of tests have been executed by the test execution engine: communicate the parent job identifier to the interface to request test results and trigger retrieval of the test results from the data store.

9. The system according to claim 8, wherein the input parameters comprise: a test execution time limit specified by the user of the user system, wherein the test enqueuer module is configured to receive the test execution time limit, and wherein the test management module further comprises:
a time tracker configured to: monitor an amount of time each test takes to execute, and issue an instruction to automatically stop any test if the amount of time that the test executes exceeds the test execution time limit for completion of that test.

10. The system according to claim 8, wherein the memory is further configured to store:
a test report generator executable by the processing system, wherein the test report generator, upon being executed by the processing system, is configured to:
receive the test results from the interface; and
generate a test report comprising: the test results for the particular subset of tests corresponding to the unique test class identifier array of filtered test class identifiers.

11. A method for executing tests in a cloud-based computing system comprising a user system and a cloud-based computing platform communicatively coupled to the user system via an interface of the cloud-based computing platform, the method comprising:
receiving input parameters specified by a user form an input system of the user system, wherein the input parameters comprise: a manifest file specified by the user of the user system, and one or more regular expressions specified by the user of the user system, wherein each regular expression is a pattern that is used to perform a pattern match to identify a particular group of one or more first test class identifiers associated with that regular expression that each correspond to a test class name of a test class;
at a processing system of the user system: grouping and filter test class identifiers, based on one or more of the input parameters, to generate a unique test class identifiers array of filtered test class identifiers that correspond to a particular subset of tests that are to be executed during testing of an application, wherein the grouping and filtering test class identifiers, further comprises:
retrieving, via a manifest file processor, the manifest file, wherein the manifest file comprises a plurality of test class names that can be used to fetch a particular group of one or more second test class identifiers from a data store of the cloud-based computing platform;
retrieving, via a regular expression processor, the one or more regular expressions;
at a query builder: generating a query associated with each of the one or more regular expressions;
at the interface: receiving each query generated by the query builder; contacting the data store and finding matching test class names for each regular expression; and returning a first test class identifier for each of the matching test class names to the query builder;
at the query builder: receiving the one or more first test class identifiers of each of the matching test class names, and grouping the one or more first test class identifiers corresponding to each of the regular expressions into a first test class identifier array;
at a manifest file reader and query builder: reading the test class names from the manifest file; sending the test class names from the manifest file to the interface; receiving, from the interface, the particular group of the one or more second test class identifiers corresponding to each of the test class names from the manifest file; and grouping the particular group of the one or more second test class identifiers into a second test class identifier array;
filtering, at a unique class ID filter, the one or more first test class identifiers from the first test class array and the one or more second test class identifiers from the second test class identifier array to generate the unique test class identifier array of filtered test class identifiers, wherein the unique test class identifier array of the filtered test class identifiers corresponds to a subset of test classes that have been defined based on the input parameters: and
at a test execution engine of the cloud-based computing platform: executing the particular subset of tests corresponding to the filtered test class identifiers of the unique test class identifier array.

12. The method according to claim 11, wherein the application is a multi-tenant application, and wherein the plurality of test class names in the manifest file comprise: a statically defined set of test class names each having a corresponding test class identifier that identifies a test class to be executed, wherein the user selects the manifest file to specify the statically defined set of test class names that are of interest to a particular sub-tenant of the multi-tenant application during testing of the multi-tenant application.

13. The method according to claim 11, wherein the user selects the one or more regular expressions to specify a particular group of one or more test class names that are of interest to a particular sub-tenant of the multi-tenant application during testing of the multi-tenant application.

14. The method according to claim 11, wherein filtering comprises:
combining the one or more first test class identifiers from the first test class identifier array and the one or more second test class identifiers from the second test class identifier array into a combined set of test class identifiers;
determining duplicate test class identifiers that are in the combined set;
determining invalid test class identifiers that are in the combined set; and
eliminating the duplicate test class identifiers and the invalid test class identifiers from the combined set to generate the unique test class identifier array of filtered test class identifiers that correspond to the particular subset of tests that are to be executed.

15. The method according to claim 11, wherein the method further comprises:
at a test management module of the user system:
receiving the unique test class identifier array of filtered test class identifiers;
communicating the filtered test class identifiers as a batch to the test execution engine;
receiving, from the test execution engine, a parent job identifier used to track status of test execution of the particular subset of tests corresponding to each of the filtered test class identifiers that are to be executed at the test execution engine; and
using the parent job identifier to poll the test execution engine to monitor the progress of the particular subset of tests; and when all tests in the particular subset of tests have been executed by the test execution engine: communicating the parent job identifier to the interface to request test results and trigger retrieval of the test results from the data store.

16. The method according to claim 15, wherein the method further comprises:
at a test report generator:
receiving the test results from the interface; and
generating a test report comprising: the test results for the particular subset of tests corresponding to the unique test class identifier array of filtered test class identifiers.

17. A computer program product, comprising:
a non-transitory computer readable medium having a computer readable program code embodied therein that is readable by a processing circuit and storing instructions for execution by the processing circuit to perform a method, the method comprising:
receiving input parameters specified by a user from an input system of a user system, wherein the input parameters comprise: one or more manifest files specified by the user of the user system each comprising a plurality of test class names that can be used to fetch a particular group of one or more first test class identifiers from a data store of a cloud-based computing platform, and one or more regular expressions specified by the user of the user system, wherein each regular expression is a pattern that is used to perform a pattern match to identify a particular group of one or more second test class identifiers associated with that regular expression that each correspond to a test class name of a test class;

grouping and filtering test class identifiers, based on one or more of the input parameters, to generate a unique test class identifier array of filtered test class identifiers that correspond to a particular subset of tests that are to be executed by a test execution engine during testing of an application, wherein the grouping and filtering test class identifiers, further comprises:

retrieving, via a manifest file processor, the manifest file, wherein the manifest file comprises a plurality of test class names that can be used to fetch the particular group of the one or more first test class identifiers from the data store of the cloud-based computing platform;

at a manifest file reader and query builder reading the test class names from the manifest file; sending the test class names from the manifest file to the interface; receiving, from the interface, the particular group of the one or more first test class identifiers corresponding to each of the test class names from the manifest file; and grouping the particular group of the one or more first test class identifiers into a first test class identifier array;

retrieving, via a regular expression processor, the one or more regular expressions;

at a query builder, generating a query associated with each of the one or more regular expressions;

at the interface receiving each query generated by the query builder; contacting the data store and finding matching test class names for each regular expression; and returning a second test class identifier for each of the matching test class names to the query builder;

at the query builder: receiving the one or more second test class identifiers for each of the matching test class names, and grouping the one or more second test class identifiers corresponding to each of the regular expression into a second test class identifier array;

filtering, at a unique class ID filter, the one or more first test class identifiers from the first test class identifier array and the one or more second test class identifiers from the second test class identifier array to generate the unique test class identifier array of filtered test class identifiers, wherein the unique test class identifier array of the filtered test class identifiers corresponds to a subset of test classes that have been defined based on the input parameters; and executing, at a test execution engine of the cloud-based computing platform, the particular subset of tests corresponding to the filtered test class identifiers specified in the unique test class identifier array.

* * * * *